(12) United States Patent
Roy

(10) Patent No.: US 7,078,752 B2
(45) Date of Patent: Jul. 18, 2006

(54) METHOD OF CONTROLLING A MOS-TYPE PHOTODETECTOR

(75) Inventor: Francois Roy, Seyssins (FR)

(73) Assignee: STMicroelectronics S.A., Montrouge (FR)

( * ) Notice: Subject to any disclaimer, the term of this patent is extended or adjusted under 35 U.S.C. 154(b) by 176 days.

(21) Appl. No.: 10/883,636

(22) Filed: Jul. 1, 2004

(65) Prior Publication Data

US 2005/0035276 A1 Feb. 17, 2005

(30) Foreign Application Priority Data

Jul. 1, 2003 (FR) .............................. 03 07962

(51) Int. Cl.
*H01L 31/113* (2006.01)

(52) U.S. Cl. ................ 257/292; 257/291; 257/290; 438/48; 438/57

(58) Field of Classification Search ............... 257/292, 257/291, 290, 294
See application file for complete search history.

(56) References Cited

U.S. PATENT DOCUMENTS

| | | | |
|---|---|---|---|
| 4,768,211 A | 8/1988 | Arques | |
| 5,625,210 A | 4/1997 | Lee et al. | |
| 5,872,371 A | 2/1999 | Guidash et al. | |
| 5,892,253 A | 4/1999 | Merrill | |
| 5,903,021 A | 5/1999 | Lee et al. | |
| 5,904,493 A | 5/1999 | Lee et al. | |

*Primary Examiner*—Douglas W. Owens
(74) *Attorney, Agent, or Firm*—Lisa K. Jorgenson; Jose Gutman; Fleit, Kain, Gibbons, Gutman, Bongini & Bianco P.L.

(57) ABSTRACT

A method of controlling a MOS-type photodetector includes transferring electrical charge between a photodiode (12) and a sensing node (3) via a transfer transistor. The electrical potential of the sensing node (3) takes an extreme value when a maximum quantity of electrical charge is stored on the sensing node (3). During the electrical charge transfer, an electrical potential is applied to the gate electrode of a transfer transistor in such a way that the electrical potential of the channel (2) of the transfer transistor is brought to a value equal to the extreme value of the electrical potential of the sensing node (3) multiplied by a number greater than or equal to unity.

12 Claims, 3 Drawing Sheets

METHOD OF CONTROLLING A MOS-TYPE PHOTODETECTOR

CROSS-REFERENCE TO RELATED APPLICATION

This application is based upon and claims priority from prior French Patent Application No. 03 07962, filed on Jul. 1, 2003, the entire disclosure of which is herein incorporated by reference.

BACKGROUND OF THE INVENTION

1. Field of the Invention

The invention relates to the field of circuits and microsystems having one or more piezoelectric and/or acoustic resonators.

2. Description of the Related Art

Photodetectors may be produced in CCD (Charge Coupled Device) technology or in MOS (Metal Oxide Semiconductor) technology. A photodetector in MOS technology is described for example in document U.S. Pat. No. 5,625,210.

Unlike CCD-type photodetectors which may be supplied by an electrical voltage source whose voltage may exceed 10 volts, MOS-type photodetectors cannot be supplied by an electrical voltage source whose voltage exceeds about 3.3 volts. As a result, the useful signal from a MOS photodetector is much weaker than that from a CCD photodetector. Consequently, a MOS photodetector can make a significant distinction between different light fluxes only if the intensity of these fluxes lies within a given interval, called the linear detection interval. Beyond this interval, the electrical signal delivered by the photodetector is no longer proportional to the luminous flux, and undesirable phenomena occur such as, in particular, blooming and/or an error in transferring electrical charge into the photodetector.

Another consequence of the lower electrical voltages used in a MOS photodetector compared with those in a CCD photodetector is the presence of residual electrical charge that is not transferred from the photodiode. This residual electrical charge remains in the photodiode, despite the process for transferring electrical charge from the photodiode to the sensing node being controlled.

Accordingly, there exists a need for overcoming the disadvantages of the prior art as discussed above.

SUMMARY OF THE INVENTION

It is one object of the present invention to propose a method of controlling a MOS-type photodetector that allows the quantity of residual electrical charge in the photodiode to be reduced.

The invention applies to a photodiode which comprises:
- a photodiode having a first electrode, connected to an electrical potential reference node, and a second electrode designed to store electrical charge generated in the photodiode;
- a sensing node;
- a control circuit;
- a transfer MOS transistor having a first channel electrode connected to the second electrode of the photodiode, a second channel electrode connected to the sensing node, and a gate electrode connected to the control circuit in order to adjust the electrical potential of a conduction channel extending between the first and second channel electrodes, making it possible to control the transfer of electrical charge from the second electrode of the photodiode to the sensing node; and
- a reset MOS transistor having a first channel electrode connected to the sensing node, a second channel electrode connected to a first terminal of an electrical potential generator, and a gate electrode, making it possible to control a removal of electrical charge stored on the sensing node to the electrical potential generator, a second terminal of the electrical potential generator being connected to the electrical potential reference node.

The photodetector is designed for storing on the second electrode of the photodiode, for transferring and for storing on the sensing node at most a maximum quantity of electrical charge. The electrical potential of the sensing node takes an extreme value when the maximum quantity of electrical charge is stored on the sensing node.

According to the invention, the method of controlling the photodetector comprises a step of transferring electrical charge from the photodiode to the sensing node, during which, at a given instant, the control circuit applies an electrical potential to the gate electrode of the transfer transistor such that the electrical potential of the conduction channel of the transfer transistor has a value equal to the extreme value of the electrical potential of the sensing node multiplied by a number greater than or equal to unity.

In the above, and likewise throughout the present patent application, all the electrical potentials are considered relative to the reference node.

According to the method of the invention, during transfer of the electrical charge from the photodiode to the sensing node, the conduction channel of the transfer transistor is brought to an electrical potential such that the conduction channel of the transfer transistor may contribute, with the sensing node, to storage of the electrical charge transferred from the photodiode. Some of the electrical charge thus transferred may then be stored in the channel of the transfer transistor. To do this, the electrical potential of the conduction channel has an absolute value greater than the absolute value of the electrical potential that the sensing node would have if the maximum quantity of electrical charge were to be stored on the sensing node alone. In addition, the electrical potential of the conduction channel is then of the same sign as the electrical potential of the sensing node in the presence of the maximum quantity of electrical charge.

Thanks to the invention, more effective transfer of the electrical charge initially present in the photodiode is obtained. This results from a higher electrical potential difference between the photodiode and the conduction channel of the transfer transistor at the given instant. The quantity of residual electrical charge, that is to say the charge capable of remaining in the photodiode after the transfer step, is then particularly small.

According to a way of implementing the method of the invention, during electrical charge transfer, the electrical potential of the gate electrode of the transfer transistor is brought to a value equal to the electrical potential of the generator or to a value equal to the electrical potential of the generator reduced by a conduction voltage of the reset transistor. The control circuit can then be simplified. This is because it is unnecessary for it to have a circuit part dedicated to the production of a specific electrical potential intended to be applied to the gate electrode of the transfer transistor during electrical charge transfer.

According to one particular way of implementing the control method of the invention, the electrical potential of the sensing node is read by a read circuit at the given instant of electrical charge transfer. To put it another way, the electrical potential of the sensing node is read when the control circuit applies an electrical potential to the gate electrode of the transfer transistor such that the electrical potential of the conduction channel of the transfer transistor has an intermediate value between the value of the electrical potential of the generator and the extreme value of the electrical potential of the sensing node.

The photodetector then has an extended linear detection interval. This is because a quantity of electrical charge greater than the maximum quantity of electrical charge can be transferred in a single go from the photodiode, owing to the fact that this quantity of electrical charge is transferred both to the sensing node and into the conduction channel of the transfer transistor. This larger quantity of electrical charge may correspond to an increased light flux illuminating the photodiode.

The invention also relates to a photodetector of the type described above, in which, at a given instant of electrical charge transfer from the photodiode to the sensing node, the control circuit applies an electrical potential to the gate electrode of the transfer transistor such that the electrical potential of the conductor channel of the transfer transistor has a value equal to the extreme value of the electrical potential of the sensing node multiplied by a number greater than or equal to unity.

Finally, the invention relates to a matrix for detecting a light flux, which comprises a plurality of photodetectors of the abovementioned type.

BRIEF DESCRIPTION OF THE DRAWINGS

Other features and advantages of the present invention will become apparent in the following description of non-limiting embodiments, with reference to the appended drawings in which.

DETAILED DESCRIPTION

Figure 1:
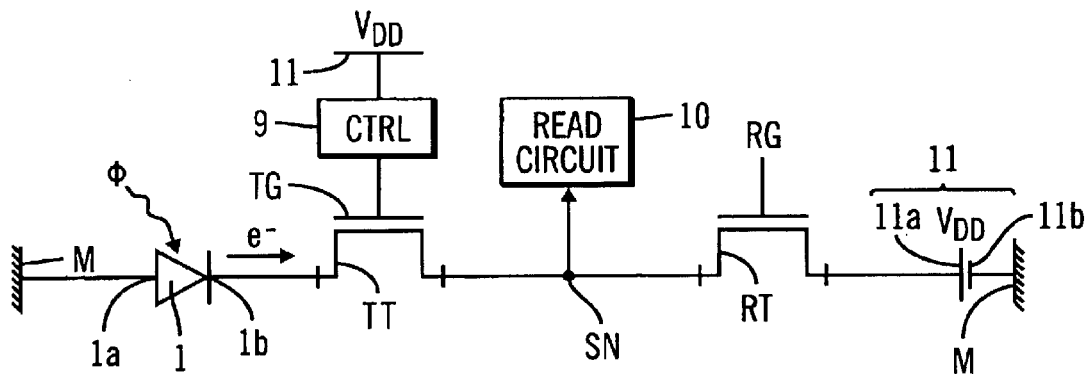
FIG. 1 is a circuit diagram of a photodetector to which the invention applies.

In FIG. 1, a photodetector to which the invention applies comprises a photodiode 1 connected via a transfer transistor TT to a sensing node SN. To do this, a second terminal 1b of the photodiode 1 is connected to a first channel electrode of the transistor TT. A second channel electrode of the transistor TT is connected to the node SN. The node SN is furthermore connected via a reset transistor RT to a first terminal 11a of an electrical potential generator 11. A second terminal 11b of the generator 11 is connected to a first terminal 11a of the photodiode 1 and constitutes an electrical potential reference node M. The photodiode 1 thus connected is reverse-mounted relative to the generator 11.

The transistors TT and RT operate as switches having two states—open and closed, corresponding to states in which the transistors are off and on, respectively.

Electrical charge generated in the photodiode 1 may thus be transferred to the node SN under the effect of a control potential for turning the transistor TT on, and then they may be removed to the generator 11 under the effect of a control potential for turning the transistor RT on.

The transistors TT and RT are produced in MOS (Metal Oxide Semiconductor) technology known to those skilled in the art. They are therefore each provided with a pair of channel electrodes (source and drain) and with a gate electrode (also called gate hereafter), TG and RG respectively. The gates TG and RG allow the respective transistor TT and RT to be turned off or on. For this purpose, they receive a control potential for adjusting the electrical potential of a conduction channel connecting the source to the drain of the transistor in question. The transistors TT and RT may, for example, be of the surface channel type, that is to say their gate is placed above part of their channel, with a thin film of an electrical insulating oxide material between the gate and the channel. Thus, in the case of a transistor TT of this type, the electrical potential of the channel is approximately equal to the electrical potential of the gate TG. For example, the difference between the electrical potential of the gate TG and the electrical potential of the channel of the transistor TT may be 0.05 volts. In the description below, such a difference will initially be neglected. The case of a transfer transistor for which this difference cannot be neglected will be treated later.

The transistor TT is controlled by a control circuit 9 connected to its gate TG. The circuit 9 may be supplied by the generator 11. The gate RG of the transistor RT may also be connected to the circuit 9.

The node SN may be formed by the gate of a MOS transistor forming part of a read circuit 10. The circuit 10 detects the electrical potential assumed by the node SN under the effect of the electrical charge stored on this node.

Electrical charge is stored on the node SN when, having been generated in the photodiode 1, it is transferred from the photodiode 1 to the node SN via the transistor TT because of a turn-on control potential received on the gate TG of the transistor.

A turn-on control potential received on the gate RG of the transistor RT allows the electrical charge stored on the sensing node SN to be removed to the generator 11.

In the example described here, the electrical charge transferred between the photodiode 1 and the node SN is in the form of electrons. The electrical potential $V_{DD}$ of the generator 11 is positive. The first and second electrodes 1a and 1b of the photodiode 1 are an anode and a cathode respectively. The transistors TT and RT are of the n-MOS type: they possess respective n-type conduction channels on a p-type substrate. The source and the drain of the transistor TT are connected to the cathode 1b of the photodiode 1 and to the node SN, respectively. The source and the drain of the transistor RT are connected to the node SN and to the positive terminal 11a of the generator 11, respectively.

Figure 2:
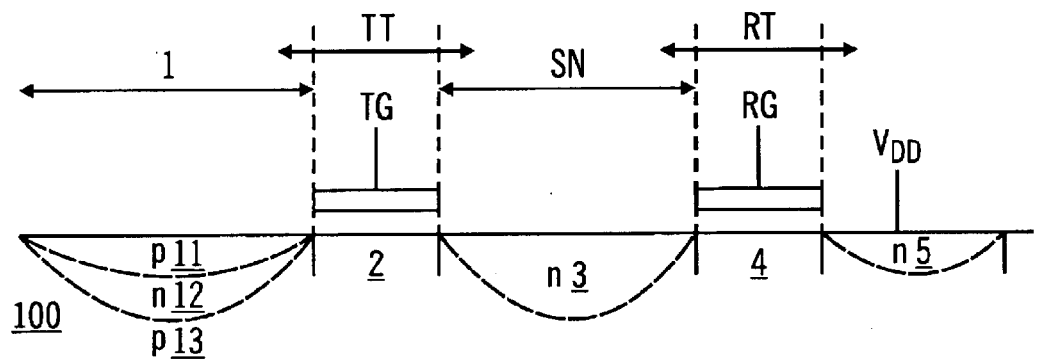
FIG. 2 is a schematic sectional view of a substrate in which part of the photodetector of FIG. 1 is produced.

FIG. 2 is a diagram showing the principle of the implantation of the above components on a substrate 100 of a semiconductor material, for example crystalline silicon. The substrate 100 may be p-doped in one or more wells inside which the photodiode 1 and the transistors TT and RT are placed.

The photodiode 1 may be of the pinned photodiode type. It then has two elementary junctions comprising, common to the two junctions, an n-doped region 12 of the substrate 100. The region 12 lies along a direction perpendicular to the surface of the substrate 100 between the two p-doped regions 11 and 13 of the substrate 100 and belonging to each respective junction. The region 12 forms the cathode 1b of the photodiode 1 and the regions 11 and 13 form the anode 1a. Electrons generated in the photodiode 1 are stored in the region 12 before being transferred to the node SN via the transistor TT.

The source of the transistor TT coincides with the region 12 of the photodiode 1. The conduction channel of the transistor TT is formed by a p-doped region 2 of the substrate 100, the region lying beneath the gate TG.

The node SN consists of an n-doped region 3 formed in the substrate 100. The region 3 thus constitutes the drain of the transistor TT and the source of the transistor RT.

The conduction channel of the transistor RT is formed by a p-doped region 4 of the substrate 100, located beneath the gate RG along the aforementioned perpendicular direction. An n-doped region 5 of the substrate 100, adjacent to the region 4 along a direction parallel to the surface of the substrate 100, constitutes the drain of the transistor RT and is connected to the positive terminal 11a of the generator 11.

An operating cycle of such a photodetector consists of the generation of electrons in the junctions of the photodiode 1 under the effect of a light flux Φ illuminating the photodiode 1 (cf. FIG. 1) then the transfer of the electrons thus generated (identified by e⁻ in FIGS. 1, 4 and 5) from the cathode 12 of the photodiode 1, where they are firstly stored (the transistors TT and RT being off), successively into the regions 2, 3, 4 and 5. In response to the transistor TT being turned on, the electrons firstly flow through the region 2 into the region 3. According to the particular embodiment of the invention, the electrical potential on the node SN is then read. In response to the transistor RT being turned on, the electrons then flow through the region 4 into the region 5, and then through the positive terminal 11a of the generator 11. The channel regions 2 and 4, the electrical potentials of which are controlled by the electrical potential on the gate TG and on the gate RG respectively, thus act as electron transfer gates.

The electrons generated in the photodiode may also comprise parasitic charge that has to be transferred from the photodiode before a luminous flux measurement. Such parasitic charge is, for example, residual charge from a prior operating cycle of the photodiode, or charge originating from a neighboring photodiode that has undergone, for example, blooming. Such parasitic electrons may be transferred so as to drain the photodiode 1, for example before precise measurement of a luminous flux Φ of particularly low intensity.

To allow complete draining, from the node SN to the generator 11, of the electrons transferred from the photodiode 1, the electrical potential of the node SN, when this node contains no transferred electron, must be below the potential $V_{DD}$ of the generator 11 less a conduction voltage of the transistor RT. This conduction voltage, denoted in FIGS. 3 to 6 by $V_{ON}(RT)$, is the difference between the respective electrical potentials of the drain (region 5) and of the source (region 3) of the transistor RT when a positive potential is applied to the gate RG. As an example, $V_{DD}$ is equal to 3.3 volts and the conduction voltage of the transistor RT is equal to 0.3 volts.

The interval of linear detection of the intensity of the luminous flux Φ is limited by the maximum quantity $Q_{max}$ of electrons which can be generated and stored in the photodiode 1 and then transferred and stored on the node SN during an operating cycle of the photodiode. To allow complete transfer of these electrons from the photodiode 1 to the node SN, it is necessary for the electrical potential of the node SN, when this node contains the quantity of electrons $Q_{max}$, to be above the electrical potential of the region 12 of the photodiode 1 when the cathode (region 12) is drained of these electrons. As an example, the photodiode 1 is doped in such a way that the electrical potential of the region 12 is equal to 1.5 volts when this region does not store generated electrons. The electrical potential of the node SN must therefore remain between 1.5 volts and 3.0 volts in order to obtain linear detection of the luminous intensity of the flux Φ.

The maximum quantity of electrons $Q_{max}$ indicated by the manufacturer of the photodetector may, for example, be 20,000 electrons. This may be limited in particular by the structure of the photodiode 1, by the efficiency of the off state of the transfer transistor TT, making it possible to keep the electrons stored in the photodiode 1, and by the storage capacity of the node SN.

The node SN possesses, depending on its geometry, an intrinsic capacitance which may, for example, be from 3 to 5 femtofarads (fF). The inverse of this capacitance is given by the manufacturer of the photodetector and is noted by the conversion factor F, which is expressed in microvolts per electron. As an example, a capacitance of the node SN of 3 fF corresponds to a conversion factor F of about 53. The useful signal from the photodetector is then $F \times Q_{max} = 1.07$ volts.

Figure 3:
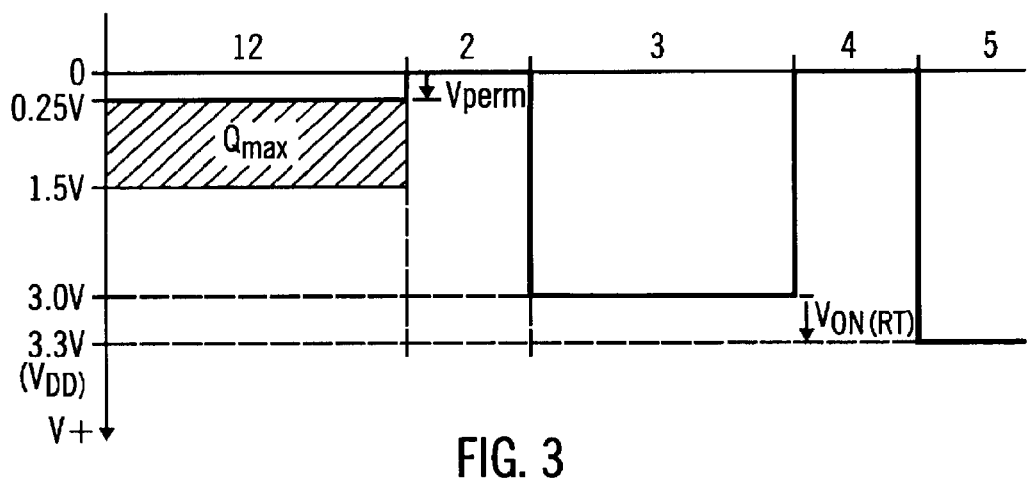
FIG. 3 is a diagram showing the distribution of electrical potentials in the substrate of FIG. 2 after electrical charge generation in the photodiode.

FIG. 3 is a diagram showing the electrical potential in the various regions 12 and 2–5 of the substrate 100 when the photodiode 1 contains the quantity of electrons $Q_{max}$. The value of the electrical potentials along the vertical axis increases downwards in FIG. 2. The electrical potential $V_{DD}$ Of the region 5 is, for example, equal to 3.3 volts. The transistors TT and RT are each in the off state. To do this, the gates TG and RG are kept at zero potential by the control circuit 9, provided that the respective channels 2 and 4 are also at respective zero electrical potentials. The electrical potential of the region 12 of the photodiode 1 lies at around 0.25 volts (denoted by $V_{perm}$ in FIG. 3). This value results from the fact that $Q_{max}$ is limited by the permeability of the transistor TT in the off state when the electrical potential of the region 12 becomes too close to the electrical potential of the channel 2. The 0.25 volts value is approximate and may vary depending on the construction of the transistor TT. FIG. 3 specifically corresponds to the distribution of the electrical potential in the substrate 1 at the end of an electrical charge generation step in the photodiode 1. The duration of this step is, for example, 30 milliseconds. The region 3 is drained of useful electrons, that is to say of electrons representative of a luminous flux Φ. It therefore has an electrical potential which depends on its doping state and which is limited by the conduction voltage $V_{oN}(RT)$ of the reset transistor. This electrical potential of the region 3 drained of useful electrons is, for example, 3.0 volts.

Figure 4:
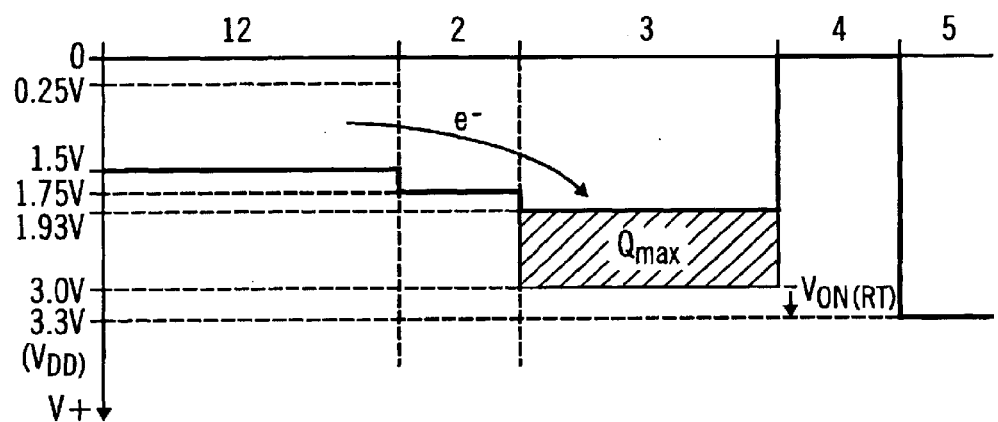
FIG. 4 is a diagram showing the distribution of electrical potentials corresponding to FIG. 3, illustrating electrical charge transfer according to the prior art.
Figure 5:
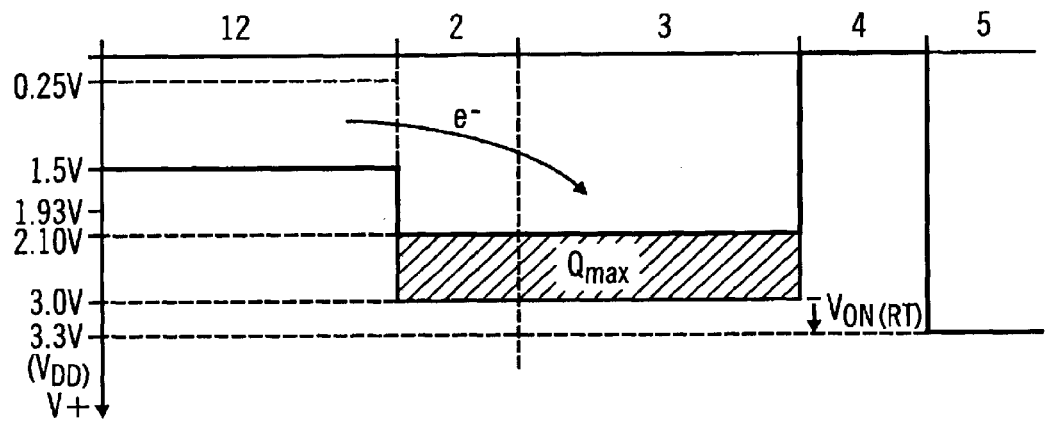
FIG. 5 is a diagram showing the distribution of electrical potentials corresponding to FIG. 3, illustrating electrical charge transfer according to the invention.

Electron transfer between the photodiode 1 and the node SN comprises two stages. During a first stage of the transfer, the transistor TT is turned on by the control circuit 9 so as to drain the useful electrons stored in the region 12 of the photodiode 1. During a second stage of the transfer, the transistor TT is turned back off by the control circuit 9. FIGS. 4 and 5 show the electrical potentials in the substrate 1 after the first stage of the electron transfer according to the prior art and according to the present invention, respectively.

According to the prior art (FIG. 4), the useful electrons stored in the region 12 of the photodiode 1 are completely transferred to the node SN during the first stage of the transfer. This complete transfer is obtained by increasing the potential of the gate TG such that the channel 2 has an electrical potential above the electrical potential of the region 12 drained of the useful electrodes and below the electrical potential of the node SN after transfer of the useful electrons. FIG. 4 corresponds to the transfer of the quantity of electrons $Q_{max}$. The quantity of electrons $Q_{max}$ present on the node SN reduces the electrical potential of the node SN by 1.07 volts in the example in question. The electrical potential of the node SN is then about 1.93 volts. This value is the extreme (lowest) value that the electrical potential of the node SN can have during an operating cycle of the photodetector in question as an example. The region 12 is drained of the useful electrons and its electrical potential is, for example, about 1.5 volts. During transfer of the useful electrons, the electrical potential of the channel 2 must have a value above 1.5 volts in order to allow all the useful electrons to be extracted from the region 12.

Using a method known to those skilled in the art, the electrical potential of the channel 2 is chosen to also be below the electrical potential on the node SN when all the useful electrons are on the node SN. It is consequently chosen to be less than 1.93 volts in the example in question. All the useful electrons are then stored on the node SN for the subsequent step of reading the electrical potential of the node SN by the read circuit 10. The electrical potential of the channel 2 is chosen, for example, to be around 1.75 volts during the first stage of the electron transfer. This electrical potential value is directly applied by the control circuit 9 to the transfer gate TG.

During the second stage of the transfer, the control circuit 9 returns the electrical potential of the gate TG to the 0 volt value.

The electrical potential of the node SN may be read by the read circuit 10 as soon as the useful electrons are stored on the node SN, that is to say after the end of the first stage of the transfer, during the second stage of the transfer or after the latter. Once the reading has been taken, the transistor RT receives the control potential for removing the useful electrons from the node SN to the regions 5.

According to the invention (FIG. 5), the electrical potential applied by the control circuit 9 to the gate TG is chosen in such a way that, during the first stage of the electron transfer, the value of the electrical potential of the channel 2 is above the extreme value of the electrical potential of the sensing node SN, reached when the maximum amount of electrons $Q_{max}$ is stored on the node SN alone. When the transistor TT is designed in such a way that the electrical potential of the channel 2 is approximately equal to the electrical potential of the gate TG, the control circuit 9 applies an electrical potential of value above the extreme value to the gate TG. Optionally, the value of the electrical potential applied to the gate TG is $V_{DD}$ or $V_{DD}$ reduced by the conduction voltage $V_{ON}(RT)$ of the reset transistor in its on state (FIG. 5).

In the case of the photodetector in question given as example, the electrical potential of the channel 2 is therefore brought by the control circuit 9 to a value above 1.93 volts.

The useful electrons are then distributed over the node SN (region 3) and in the channel 2. To put it another way, when the gate TG is controlled in this way, the channel 2 contributes, through its own capacitance, to the storage of the useful electrons. For the same quantity of useful electrons, the value of the electrical potential of the node SN is then above that obtained when only the node SN stores the useful electrons. In FIGS. 4 and 5, the hatched regions represent the same quantity of useful electrons, namely $Q_{max}$. The value of the electrical potential of the region 3 read according to FIG. 5 (i.e. about 2.10 volts) is above that read according to FIG. 4 (i.e. about 1.93 volts).

The electrical potential of the node SN may be read during this first stage of the electron transfer, by means of the read circuit 10. Thanks to the invention, the quantity of useful electrons corresponding to the same electrical potential of the node SN that is read is increased, which helps to increase the linear detection interval of the photodetector. In certain cases, the electrical potential of the channel 2 may not be brought to too high a value, for example in order not to prevent the useful electrons stored in the channel 2 from contributing to the read value of the electrical potential of the node SN. In this case, the value of the electrical potential of the channel 2 may remain less than or equal to $V_{DD}$, or less than or equal to $V_{DD}$ reduced by $V_{ON}(RT)$.

Optionally, the transistor RT can then be controlled so as to remove the useful electrons from the node SN to the region 5. Preferably, the useful electrons are removed from the node SN to the region 5 after the second stage of electron transfer.

After the electrical potential of the node SN has been read, the control circuit 9 reduces the electrical potential of the gate TG so as to turn the transistor TT off again, for the start of a new operating cycle of the photodetector. During this second stage of the electron transfer, the electrical potential of the gate TG is thus returned from 3.3 volts, or 3.0 volts, to approximately zero volts in the example in question. Given that useful electrons are present in the channel 2 at the start of the second stage of the transfer, a rapid reduction in the potential of the gate TG could cause the useful electrons to return to the photodiode 1. To avoid such an electron return, the control circuit 9 changes the electrical potential of the gate TG towards the electrical potential of the reference node M, preferably over a time longer than the duration of displacement of the electrons between the channel 2 of the transistor TT and the node SN. The time required for displacement of the electrons between the channel 2 and the node SN depends on the configuration of the regions 2 and 3 and on the mobility of the electrons in the channel 2. Thus, during the second stage of the electron transfer, the electrons present in the channel 2 are completely transferred to the node SN, draining the channel 2.

Figure 6:
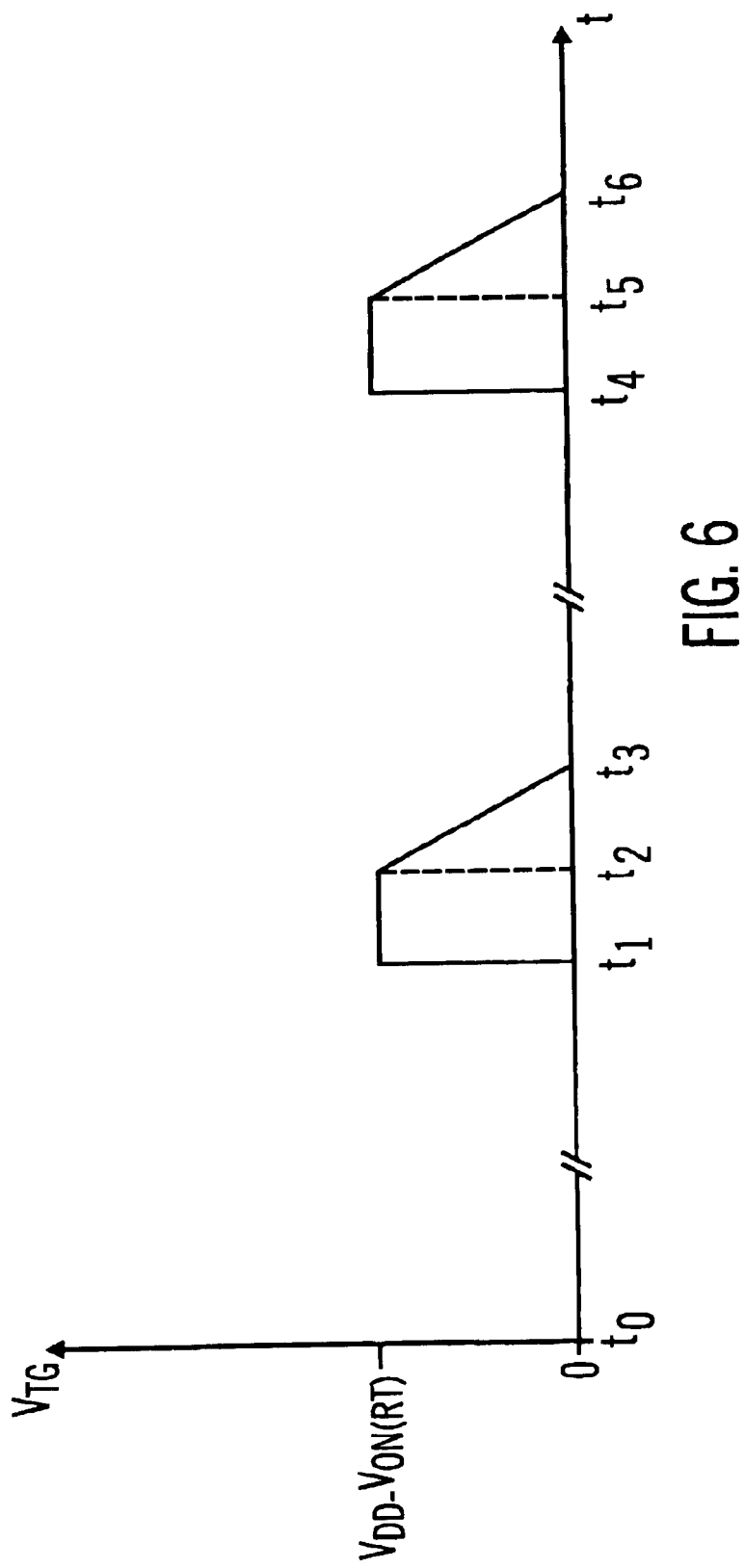
FIG. 6 is a graph showing the variation over time of the electrical potential on the gate of the transfer transistor of the photodetector according to the invention.

FIG. 6 is a diagram showing the variation of the electrical potential applied by the control circuit 9 to the gate TG, as a function of time, according to the invention. It shows two successive operating cycles of the photodetector: the first cycle between times $t_0$ and $t_3$ and the second cycle between times $t_3$ and $t_6$. Each cycle may have a duration of 30 milliseconds. The time intervals, between $t_0$ and $t_1$ and between $t_3$ and $t_4$, correspond to steps during which electrons are generated in the photodiode 1 by a light flux $\Phi$ that illuminates the photodetector. The durations of these electron generation steps may, for example, be each 29 milliseconds. During these time periods, the control circuit 9 applies a zero potential to the gate TG so as to keep the transistor TT in the off state. The time intervals, between $t_1$ and $t_2$ and between $t_4$ and $t_5$, each correspond to the first stages of electron transfer to the node SN. The control circuit 9 then applies, for example, an electrical potential close to $V_{DD}$, or close to $V_{DD}$ less $V_{ON}(RT)$, to the gate TG. The read circuit 10 may be activated during these time intervals. The time intervals between $t_2$ and $t_3$ and between $t_5$ and $t_6$ each correspond to the second stages of electron transfer to the node SN. During these intervals, the control circuit 9 lowers the electrical potential of the gate TG at a controlled rate. The first and second stages of transfer may each have a duration of, for example, 5 microseconds.

If the read circuit is not activated between times $t_1$ and $t_2$, or alternatively $t_4$ and $t_5$, it is activated after time $t_2$, or alternatively $t_5$, especially after $t_3$, or alternatively $t_6$, in the case of each operating cycle.

During the electron generation step of each operating cycle of the photodetector, the gate RG is controlled in order to remove, from the node SN to the generator 11, the electrons transferred from the photodiode 1 to the node SN during the preceding cycle. It is momentarily vacant from 0 volts to $V_{DD}$ in order to allow this removal.

The invention also applies to photodetectors in which, in the transistor TT, there is a difference between the electrical potentials of the gate TG and the channel 2. Such a difference appears when the electrical potential of the gate TG is positive. This difference depends on the arrangement, the nature and the concentration of the doping, and on the bias state of the transistor TT. It is referred to as the threshold voltage $V_s(TT)$ of the transfer transistor. Thus, $$V(TT) = V_{TG} - V_{channel}, \qquad (1)$$

where $V_{TG}$ is the electrical potential of the gate TG and $V_{channel}$ is the electrical potential of the channel 2 of the transistor TT. The threshold voltage $V_s(TT)$ is positive in the case of a p-type MOS transistor and may be between 0.6 and 1.2 volts.

During the electrical charge generation step, for a photodetector of this type, the control circuit 9 may, as previously, apply a zero electrical potential to the gate TG, relative to the reference node M: $V_{TG}=0$ volts. The transistor TT is then off. The electrical potential of the channel 2 is then set by the substrate 100: $V_{channel}=0$ volts. The distribution of the electrical potentials shown in FIG. 3 is valid in this case too.

The first stage of electron transfer in the case of a photodetector for which the transistor TT possesses a non-zero threshold voltage $V_s(TT)$ is again illustrated in FIG. 4, when this stage is carried out according to the prior art. The numerical values for $Q_{max}$, F and the electrical potentials of the regions 12 and 2 to 5 of the substrate 100 indicated above by way of example may be adopted. To obtain an electrical potential of the channel 2 lying at around 1.75 volts during electron transfer, the control circuit 9 applies, to the transfer electrode TG, an electrical potential increased by $V_s(TT)$ compared with the previous case. Thus:

$$V_{TG}=1.75 \text{ volts}+V_s(TT) \tag{2}$$

during electron transfer, in the case of the example in question.

The application of the invention to a photodetector for which the transistor TT possesses a non-zero threshold voltage $V_s(TT)$ is again illustrated in FIG. 5. To obtain an electrical potential of the channel 2 above the value of the electrical potential of the node SN when the quantity of electrons $Q_{max}$ is present on the node alone (situation in FIG. 4), that is to say above the extreme value of the electrical potential of the node SN, the control circuit 9 must apply to the transfer gate TG an electrical potential above the extreme value increased by the threshold voltage $V_s$. Thus:

$$V_{TG}>V_{ext}(SN)+V_s(TT) \tag{3}$$

where $V_{ext}(SN)$ denotes the extreme value of the electrical potential of the node SN. According to the definition of the extreme value of the electrical potential of the node SN:

$$V_{ext}(SN)=V_{DD}-V_{ON}(RT)-F \times Q_{max} \tag{4}$$

In the case of the particular photodetector in question given as an example, $V_{ext}(SN)$ is equal to 1.93 volts.

Consequently, according to the invention and when the electrical charge generated in the photodiode is in the form of electrons, the electrical potential $V_{TG}$ applied to the gate must, at least at a given instant of electron transfer from the photodiode to the sensing node, satisfy the following relationship:

$$V_{TG}>V_{DD}-V_{ON}(RT)-F \times Q_{max}+V_s(TT), \tag{5}$$

where $V_s(TT)$ is the threshold voltage of the transistor TT and $V_{ON}(RT)$ is the conduction voltage of the transistor RT in the on state, between its drain and its source. These voltages may be determined using one of the methods known to those skilled in the art.

In particular, the electrical potential $V_{DD}$ of the generator 11, possibly reduced by the conduction voltage $V_{ON}(RT)$, may be applied to the transfer gate TG.

The threshold voltage of the transfer transistor $V_s(TT)$ may especially be estimated during the first stage of electron transfer from the photodiode 1 to the node SN. When the electrons flow progressively from the cathode 1b of the photodiode 1 into the channel 2 of the transistor TT, the following equation is satisfied:

$$V_{channel}=V_{1b}-V_{perm} \tag{6}$$

where $V_{1b}$ is the electrical potential of the cathode 1b of the photodiode 1 and $V_{perm}$ is the permeability threshold of the transistor TT. In general, $V_{perm}$ is around 0.25 volts. The following equation is then satisfied:

$$V_s(TT)=V_{TG}-V_{1b}+V_{perm} \tag{7}$$

$V_{TG}$ and $V_{1b}$ may be measured during the first stage of electron transfer and $V_s(TT)$ may then be calculated.

The conduction voltage $V_{ON}(RT)$ of the reset transistor may be measured during removal of the electrons from the node SN to the generator 11. Therefore:

$$V_{ON}(RT)=V_{DD}-V_{SN} \tag{8}$$

where $V_{SN}$ is the electrical potential of the node SN during removal of the electrons to the generator 11.

Of course, the invention also applies to a photodetector in which the useful electrical charge is in the form of holes. In this case, the description and the equations (1) to (8) must be transposed, this being within the competence of a person of ordinary skill in the art.

While there has been illustrated and described what is presently considered to be embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of controlling a photodetector that comprises:

a photodiode having a first electrode connected to an electrical potential reference node, and a second electrode designed to store electrical charge generated in the photodiode;

a sensing node;

a control circuit;

a transfer MOS transistor having a first channel electrode connected to the second electrode of the photodiode, a second channel electrode connected to the sensing node, and a gate electrode connected to the control circuit in order to adjust the electrical potential of a conduction channel extending between the first and second channel electrodes, making it possible to control the transfer of electrical charge from the second electrode of the photodiode to the sensing node; and a reset MOS transistor having a first channel electrode connected to the sensing node, a second channel electrode connected to a first terminal of an electrical potential generator, and a gate electrode, making it possible to control a removal of electrical charge stored on the sensing node to the electrical potential generator, a second terminal of the electrical potential generator being connected to the electrical potential reference node, the photodetector being designed for storing on the second electrode of the photodiode, for transferring and for storing on the sensing node at most a maximum quantity of electrical charge, the electrical potential of the sensing node taking an extreme value when the maximum quantity of electrical charge is stored on the sensing node, the method comprising:

at a given instant of electrical charge transfer, the control circuit applying an electrical potential to the gate electrode of the transfer transistor such that the electrical potential of the conduction channel of the transfer transistor has a value equal to the extreme value of the electrical potential of the sensing node multiplied by a number greater than or equal to unity, the electrical potentials being considered relative to the reference node, and wherein, after the given instant of electrical charge transfer, the control circuit causes the electrical potential of the gate electrode of the transfer transistor to vary towards the electrical potential of the reference node over a time longer than the duration of displacement of electrical charge between the conduction channel of the transfer transistor and the sensing node.

2. The method according to claim 1, wherein the electrical potential of the sensing node is read by a read circuit at the given instant of electrical charge transfer.

3. The method according to claim 1, wherein the transfer transistor is designed in such a way that, at least at the given instant of electrical charge transfer, the electrical potential of the conduction channel of the transfer transistor is approximately equal to the electrical potential of its gate electrode.

4. The method according to claim 1, wherein, at the given instant of electrical charge transfer, the electrical potential of the gate electrode of the transfer transistor is brought to one of a value equal to the electrical potential of the generator, and a value equal to the electrical potential of the generator reduced by a conduction voltage of the reset transistor.

5. A photodetector comprising:

a photodiode having a first electrode, connected to an electrical potential reference node, and a second electrode designed to store electrical charge generated in the photodiode;

a sensing node;

a control circuit;

a transfer MOS transistor having a first channel electrode connected to the second electrode of the photodiode, a second channel electrode connected to the sensing node, and a gate electrode connected to the control circuit and arranged in order to adjust the electrical potential of a conduction channel extending between the first and second channel electrodes, the control circuit and the transfer transistor being arranged to control the transfer of electrical charge from the second electrode of the photodiode to the sensing node; and a reset MOS transistor having a first channel electrode connected to the sensing node, a second channel electrode connected to a first terminal of an electrical potential generator, and a gate electrode, designed to remove electrical charge stored on the sensing node to the electrical potential generator, a second terminal of the electrical potential generator being connected to the electrical potential reference node, the photodetector being designed for storing on the second electrode of the photodiode, for transferring and for storing on the sensing node at most a maximum quantity of electrical charge, the electrical potential of the sensing node taking an extreme value when the maximum quantity of electrical charge is stored on the sensing node, and wherein, at a given instant of electrical charge transfer, the control circuit is designed to apply an electrical potential to the gate electrode of the transfer transistor such that the electrical potential of the conductor channel of the transfer transistor has a value equal to the extreme value of the electrical potential of the sensing node multiplied by a number greater than or equal to unity, the electrical potentials being considered relative to the reference node, and wherein the control circuit is designed to vary the electrical potential of the gate electrode of the transfer transistor towards the electrical potential of the reference node after the given instant of electrical charge transfer, over a time longer than the duration of displacement of electrical charge between the conduction channel of the transfer transistor and the sensing node.

6. The photodetector according to claim 5, comprising a read circuit designed to read the electrical potential of the sensing node at the given instant of electrical charge transfer.

7. The photodetector according to claim 5, wherein the transfer transistor is designed in such a way that, at least at the given instant of electrical charge transfer, the electrical potential of the conduction channel of the transfer transistor is approximately equal to the electrical potential of its gate electrode.

8. The photodetector according to claim 5, wherein the control circuit is designed to apply, to the gate electrode of the transfer transistor, at the given instant of electrical charge transfer, an electrical potential having a value equal to one of the electrical potential of the generator, and the electrical potential of the generator reduced by a conduction voltage of the reset transistor.

9. A matrix for detecting a light flux, the matrix comprising:

a plurality of photodetectors, each photodetector of the plurality of photodetectors comprising:

a photodiode having a first electrode, connected to an electrical potential reference node, and a second electrode designed to store electrical charge generated in the photodiode;

a sensing node;

a control circuit;

a transfer MOS transistor having a first channel electrode connected to the second electrode of the photodiode, a second channel electrode connected to the sensing node, and a gate electrode connected to the control circuit and arranged in order to adjust the electrical potential of a conduction channel extending between the first and second channel electrodes, the control circuit and the transfer transistor being arranged to control the transfer of electrical charge from the second electrode of the photodiode to the sensing node; and a reset MOS transistor having a first channel electrode connected to the sensing node, a second channel electrode connected to a first terminal of an electrical potential generator, and a gate electrode, designed to remove electrical charge stored on the sensing node to the electrical potential generator, a second terminal of the electrical potential generator being connected to the electrical potential reference node, the photodetector being designed for storing on the second electrode of the photodiode, for transferring and for storing on the sensing node at most a maximum quantity of electrical charge, the electrical potential of the sensing node taking an extreme value when the maximum quantity of electrical charge is stored on the sensing node, and wherein, at a given instant of electrical charge transfer, the control circuit is designed to apply an electrical potential to the gate electrode of the transfer transistor such that the electrical potential of the conductor channel of the transfer transistor has a value equal to the extreme value of the electrical potential of the sensing node multiplied by a number greater than or equal to unity, the electrical potentials being considered relative to the reference node, and wherein the control circuit of at least one photodetector of the plurality of photodetectors being designed to vary the electrical potential of the gate electrode of the transfer transistor towards the electrical potential of the reference node after the given instant of electrical charge transfer, over a time longer than the duration of displacement of electrical charge between the conduction channel of the transfer transistor and the sensing node.

10. The matrix of claim 9, wherein at least one photodetector of the plurality of photodetectors comprising:

a read circuit designed to read the electrical potential of the sensing node at the given instant of electrical charge transfer.

11. The matrix of claim 9, wherein the transfer transistor of at least one photodetector of the plurality of photodetectors being designed in such a way that, at least at the given instant of electrical charge transfer, the electrical potential of the conduction channel of the transfer transistor is approximately equal to the electrical potential of its gate electrode.

12. The matrix of claim 9, wherein the control circuit of at least one photodetector of the plurality of photodetectors being designed to apply, to the gate electrode of the transfer transistor, at the given instant of electrical charge transfer, an electrical potential having a value equal to one of the electrical potential of the generator, and the electrical potential of the generator reduced by a conduction voltage of the reset transistor.

* * * * *

UNITED STATES PATENT AND TRADEMARK OFFICE
CERTIFICATE OF CORRECTION

PATENT NO. : 7,078,752 B2
APPLICATION NO. : 10/883636
DATED : July 18, 2006
INVENTOR(S) : Francois Roy It is certified that error appears in the above-identified patent and that said Letters Patent is hereby corrected as shown below:

On the cover page, under (56) References Cited, please add the following:

FOREIGN PATENT DOCUMENTS

EP        0 942 593        9/1999

Signed and Sealed this

Twenty-fourth Day of October, 2006

JON W. DUDAS
*Director of the United States Patent and Trademark Office*